United States Patent
French et al.

(10) Patent No.: US 8,762,953 B2
(45) Date of Patent: Jun. 24, 2014

(54) EXCEPTION-BASED ERROR HANDLING IN AN ARRAY-BASED LANGUAGE

(75) Inventors: Scott French, Natick, MA (US); Vlad Farfel, Marblehead, MA (US); Murali Yeddanapudi, Watertown, MA (US); Vadim Teverovsky, Acton, MA (US)

(73) Assignee: The MathWorks, Inc., Natick, MA (US)

( * ) Notice: Subject to any disclaimer, the term of this patent is extended or adjusted under 35 U.S.C. 154(b) by 1239 days.

(21) Appl. No.: 11/987,197

(22) Filed: Nov. 28, 2007

(65) Prior Publication Data

US 2009/0019273 A1    Jan. 15, 2009

Related U.S. Application Data

(60) Provisional application No. 60/929,794, filed on Jul. 12, 2007.

(51) Int. Cl.
*G06F 9/44* (2006.01)
*G06F 11/00* (2006.01)

(52) U.S. Cl.
USPC ............................................. 717/128; 714/45

(58) Field of Classification Search
USPC ........................................................ 717/127
See application file for complete search history.

(56) References Cited

U.S. PATENT DOCUMENTS

| | | | | |
|---|---|---|---|---|
| 6,502,213 B1 * | 12/2002 | Bowman-Amuah | ............ | 714/49 |
| 6,862,711 B1 * | 3/2005 | Bahrs et al. | .................. | 717/127 |
| 7,003,778 B2 * | 2/2006 | Sokolov | ......................... | 719/318 |
| 7,036,045 B2 * | 4/2006 | Broussard et al. | .............. | 714/37 |
| 7,234,161 B1 * | 6/2007 | Maufer et al. | ................... | 726/12 |
| 7,484,209 B2 * | 1/2009 | Avakian et al. | ................ | 717/118 |
| 7,627,865 B2 * | 12/2009 | Muhlestein et al. | ........... | 717/165 |
| 2003/0018961 A1 | 1/2003 | Ogasawara | | |
| 2005/0015750 A1 * | 1/2005 | Bley et al. | ...................... | 717/127 |
| 2006/0070027 A1 | 3/2006 | Schmelter | | |
| 2006/0227771 A1 * | 10/2006 | Raghunath et al. | ............ | 370/389 |

FOREIGN PATENT DOCUMENTS

EP    1145106 B1 *    4/2003    ................ G06F 9/00

OTHER PUBLICATIONS

"Error Handling", Matlab® Programming, New for Matlab 7.0, The MathWorks, Inc., pp. 7-1 through 7-23, Jun. 2004.
"Error Handling", Matlab® Programming, Revised for Matlab 7.0.1, The MathWorks, Inc., pp. 7-1 through 7-23, Sep./Oct. 2004.
"Error Handling", Matlab® Programming, Revised for Matlab 7.0.4, The MathWorks, Inc., pp. 7-1 through 7-23, Mar. 2005.
"Error Handling", Matlab® Programming, Revised for Matlab 7.1, The MathWorks, Inc., pp. 7-1 through 7-24, Sep. 2005.
"Error Handling", Matlab® Programming, Revised for Matlab 7.2, The MathWorks, Inc., pp. 7-1 through 7-25, Mar. 2006.
"Error Handling", Matlab® Programming, Revised for Matlab 7.3, The MathWorks, Inc., pp. 8-1 through 8-25, Sep. 2006.

(Continued)

*Primary Examiner* — Ryan Coyer
(74) *Attorney, Agent, or Firm* — Venable LLP; Michael A. Sartori; Todd R. Farnsworth

(57) ABSTRACT

A computer-readable medium stores computer-executable instructions. The medium may hold: one or more instructions for executing a first code block; one or more instructions for generating an exception object based on the executing of the first code block; one or more instructions for receiving the exception object at a second code block; and one or more instructions for storing the exception object in a memory.

5 Claims, 9 Drawing Sheets

(56) References Cited

OTHER PUBLICATIONS

"Error Handling", Matlab® Programming, Revised for Matlab 7.4, The MathWorks, Inc., pp. 8-1 through 8-26, Mar. 2007.
"Error Handling", Matlab® Programming, Revised for Matlab 7.5, The MathWorks, Inc., pp. 8-1 through 8-34, Sep. 2007.
European Search Report issued in European Patent Application No. 08780084.3 dates Nov. 23, 2012.
Venners "Exceptions in Java—The full story of exceptions in the Java language and virtual machine," Javaworld.com, Jul. 1998, pp. 1-15, retrieved from: http://www.javaworld.com/jw-07-1998/jw-07-exceptions.html.
Robillard et al., "Designing Robust Java Programs with Exceptions," Proceedings of the 8$^{th}$ ACM Sigsoft International Symposium on Foundations of Software Engineering 21$^{st}$ Century Applications, 2000, pp. 2-10.
Summons to Attend Oral Proceedings issued in European Application No. 08780084.3 dated May 22, 2013.

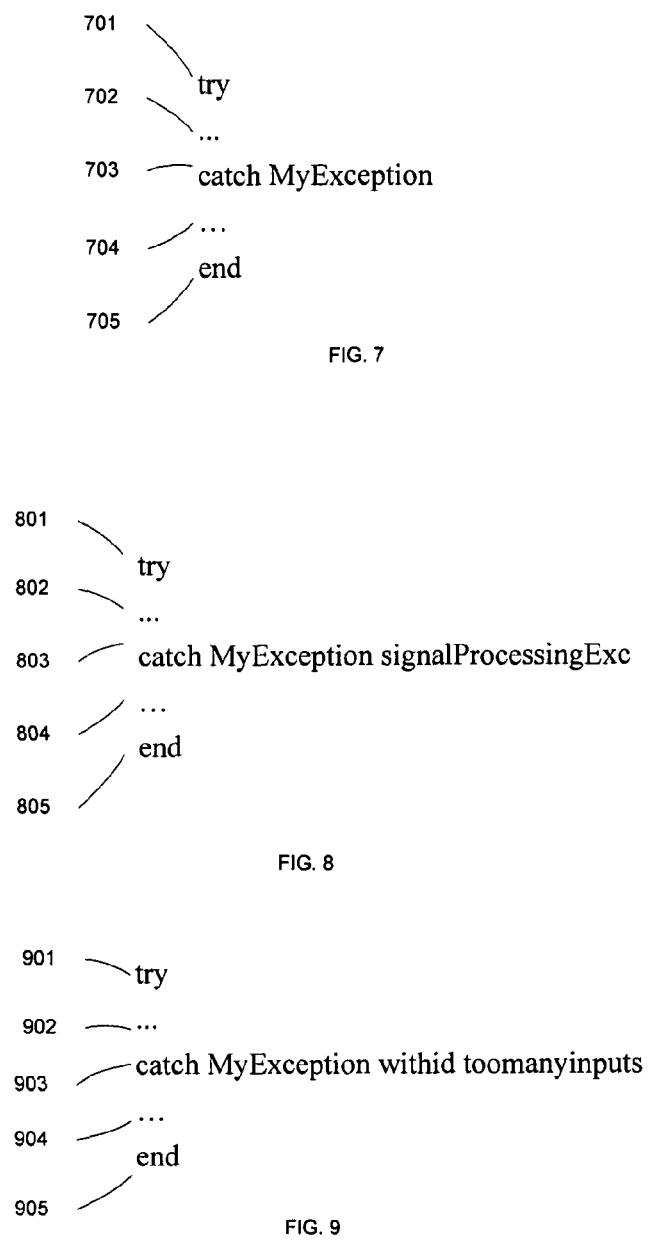

* cited by examiner 701
702 try
...
703 catch MyException
704 ...
end
705

FIG. 7

801
802 try
...
803 catch MyException signalProcessingExc
804 ...
end
805

FIG. 8

901 try
902 ...
903 catch MyException withid toomanyinputs
904 ...
end
905

FIG. 9

```
1001  try
1002   ...
1003   catch Exc signalProcessingExc withid
       'toomanyinputs'
1004   ...
1005   end
```

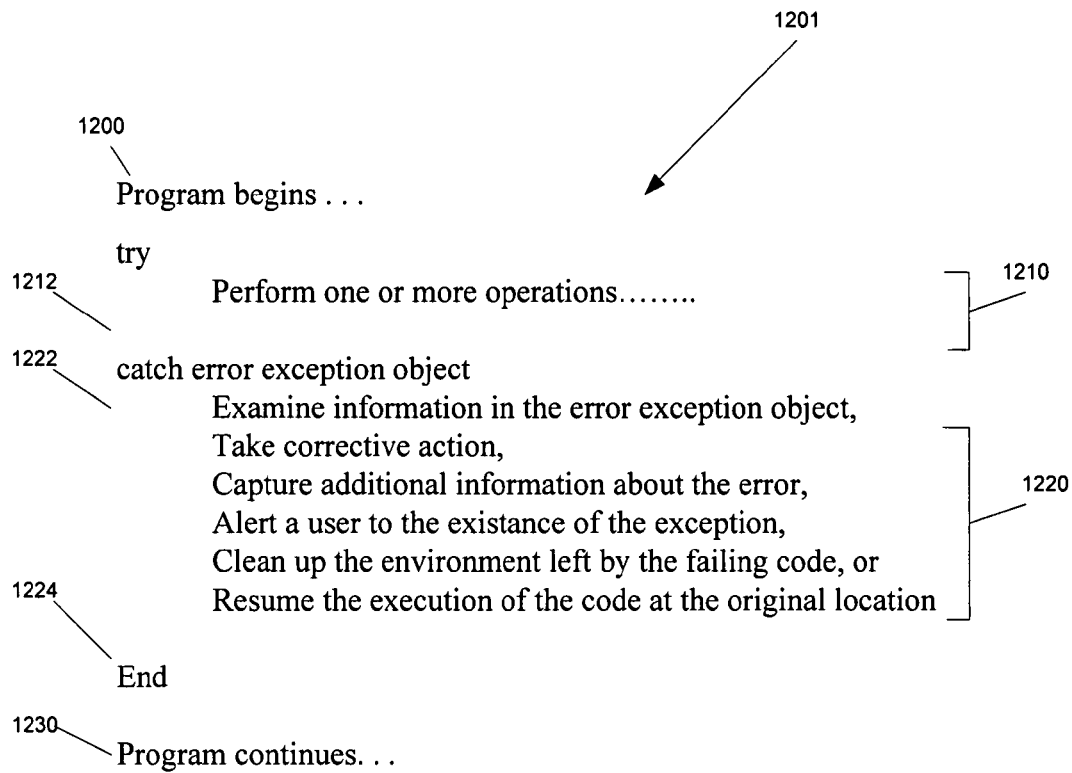
FIG. 12 – Prior Art

EXCEPTION-BASED ERROR HANDLING IN AN ARRAY-BASED LANGUAGE

CROSS-REFERENCE TO RELATED PATENT APPLICATION

This application claims priority to U.S. Provisional Patent Application No. 60/929,794 to French et al., filed Jul. 12, 2007 entitled "Multi-Point Interface for a Graphical Modeling Environment," the subject matter of which is being incorporated herein by reference in its entirety.

BACKGROUND

Exception-based error handling refers to a programming language construct designed to handle the occurrence of a condition that changes the normal flow of a program during run time. Run time may refer to the operation of a computer program, during code execution (from beginning to end). A condition that changes the normal flow of a program may lead to an error. An exception is then used to signal that an error condition has occurred and the code could not execute normally.

Exception handlers may be used by a programming language to capture information about an exception and to deal with the exception. FIG. 12 depicts psuedocode for an exemplary exception handler, a try/catch construct 1201, which may be placed into program 1200. Try/catch construct 1201 may be comprised of two sections, a 'try' block 1210, which may begin with a 'try' statement 1212, and a 'catch' block 1220, which may begin with a 'catch' statement 1222. On execution, the code enters the 'try' statement 1212 of the try/catch construct 1201 and executes each statement as if it were part of the regular program. The try/catch construct 1201 may begin with the 'try' block 1210, comprising all lines between the 'try' statement 1212 and the 'catch' statement 1222. Once an error occurs, the 'try' block 1210 skips any remaining code in the 'try' block 1210 and jumps to the start of the catch block. If all operations in the 'try' block 1210 succeed, execution skips the 'catch' block 1220 and continues to the first line of code 1230 following the 'end' statement 1224. Once an error occurs an exception object may be created and control over the code execution may then transfer to the 'catch' block 1220 which may contain an exception handler and end with an 'end' statement 1224. The exception object may contain information about the error and the state of the code when the error occurred. Exemplary handler statements may be, for example, 'catch' 1222 'except,' or 'rescue.' The catch block 1220 may then allow the user to examine the information in the error exception object, take corrective action, capture additional information about the error, alert a user to the existence of the exception, clean up the environment that was left by the failing code, or resume the execution of the code at the original location, using the information saved above to restore the code to its original state.

The foregoing and other features of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

SUMMARY OF THE INVENTION

In one exemplary embodiment, a computer-readable medium stores computer-executable instructions. The medium may hold: one or more instructions for executing a first code block; one or more instructions for generating an exception object based on the executing of the first code block; one or more instructions for receiving the exception object at a second code block; and one or more instructions for storing the exception object in a memory.

In another embodiment, a computer-readable medium stores computer-executable instructions. The medium holds one or more instructions for executing a first code block, the first code block calling a second code block; one or more instructions for executing the second code block; one or more instructions for generating an exception object resulting from the execution of the second code block, wherein the exception object appears as if generated by the first code block; and one or more instructions for storing the exception object in memory.

In another embodiment, a computer-readable medium stores computer-executable instructions. The medium holds one or more instructions for executing a first code block; one or more instructions for generating an exception object based on the execution of the first code block, the exception object associated with a class; one or more instructions for associating an identifier field with the exception object, the identifier field identifying at least one of the exception object or the class of the exception object; one or more instructions for receiving the exception object based on the identifier field; and one or more instructions for storing the exception object in memory.

In another embodiment, computer-executable operations execute a first code block. An exception object resulting from the execution of the first code block is generated. An array of causes is associated with the generated exception object. The exception object is received at a second code block. The exception object is stored in memory.

In another exemplary embodiment, computer-executable operations execute a first code block, the first code block calling a second code block. The second code block is executed. An exception object resulting from the execution of the second code block is generated, the exception object being made to appear as if it is generated by the first code block. The exception object is stored in memory.

In another exemplary embodiment, computer-executable operations execute a first code block. An exception object resulting from the execution of the first code block is generated. An identifier field is associated with the exception object. The identifier field identifies at least one of the exception object and a class of the exception object. The exception object is received based on its identifier field. The exception object is stored in memory.

In yet another embodiment, a system for error handling executes a first code block. An exception object resulting from an error detected during the execution of the first code block is generated. The error resulted from an array of causes. The array of causes is associated with the generated exception object. The exception object is received. The exception object is stored in memory.

In another embodiment, a system for error handling executes a first code block. An exception object based on an error detected during the executing of the first code block is generated. The error resulting from an array of causes. The array of causes is associated with the generated exception object. The exception object is received. The exception object is stored in memory.

In another embodiment, a system for error handling executes a first code block, the first code block calling a second code block. The second code block is executed. An exception object resulting from the execution of the second code block is generated. The exception object is made to appear as if it is generated by the first code block. The exception object is stored in memory.

In another embodiment, a system for error handling executes a first code block, the first code block calling a second code block. The second code block is executed. An exception object resulting from the execution of the second code block is generated. The exception object is modified to appear as if it was generated by the first code block. The exception object is stored in memory.

BRIEF DESCRIPTION OF THE DRAWINGS

FIG. 7 depicts exemplary pseudo-array-based language code for an exemplary try/catch construct according to an exemplary embodiment.

FIG. 8 depicts exemplary pseudo-array-based language code for an exemplary try/catch construct according to an exemplary embodiment.

FIG. 9 depicts exemplary pseudo-array-based language code for an exemplary try/catch construct according to an exemplary embodiment.

FIG. 12 illustrates an exemplary exception handler according to the prior art.

DEFINITIONS

Figure 1A:
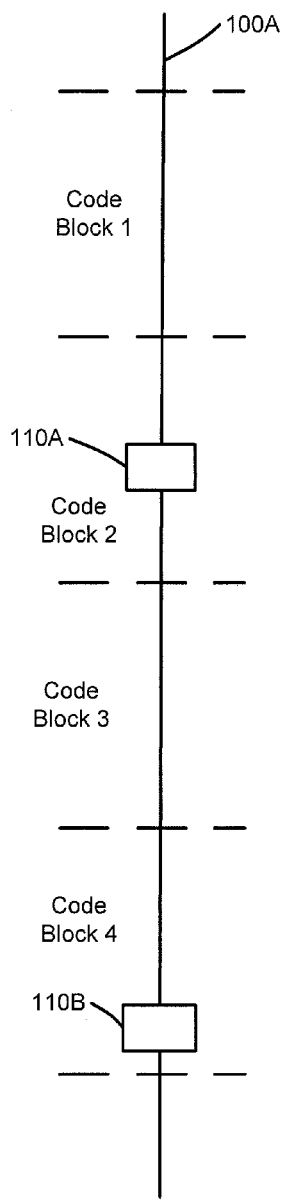
FIGS. 1A and 1B depicts the execution of exemplary code according to an exemplary embodiment.

In describing the invention, the following definitions are applicable throughout (including above).

A computer may refer to one or more apparatus and/or one or more systems that are capable of accepting a structured input, processing the structured input according to prescribed rules, and producing results of the processing as output. Examples of a computer may include: a stationary and/or portable computer; a computer having a single processor, multiple processors, or multi-core processors, which may operate in parallel and/or not in parallel; a general purpose computer; a supercomputer; a mainframe; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; a tablet personal computer (PC); application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; an analog circuit; a system-on-chip (SoC) or a multiprocessor system-on-chip (MPSoC); an optical computer; and an apparatus that may accept data, may process data in accordance with one or more stored software programs, may generate results, and typically may include input, output, storage, arithmetic, logic, and control units Software may refer to prescribed rules to operate a computer. Examples of software may include: code segments; instructions; applets; pre-compiled code; compiled code; interpreted code; computer programs; and programmed logic.

A computer-readable medium may refer to any storage device used for storing data accessible by a computer. Examples of a computer-readable medium may include: memory; cache memory; registers; a magnetic hard disk; a floppy disk; an optical disk, such as a CD-ROM and a DVD; a magnetic tape; a memory chip; a flash drive, and/or other types of media that can store machine-readable instructions thereon.

A computer system may refer to a system having one or more computers, where some computers may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A network may refer to a number of computers and associated devices that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. The examples and embodiments described herein are non-limiting examples.

A number of modern programming languages rely on error-handling mechanisms that do not allow for efficient identification of what errors occurred or where errors occurred in a section of code at run time. When an error occurs, some current error handling techniques store minimal information pertaining to that error, such as the text of the error and an identifying string, in a single, global state. Information in the global state may then be accessed by a call to a function that displays the contents of the global state. This technique prevents a user from efficiently addressing errors in the code for several reasons.

One reason is the inability of a user to efficiently examine multiple errors. For example, if three errors occur during run time, information pertaining to the first error is caught and stored in the global state. Once the second error occurs, the information pertaining to the first error may be discarded or, at best, combined with the information pertaining to the second error. This combined information is then stored in the global state. Once the third error occurs, the information pertaining to the first and second errors may be discarded or, at best, combined with the information pertaining to the third error. Hence, the user would be unable to access all of the information pertaining to the first and second errors without debugging the code in order to determine where all of the errors occurred.

A second reason is the inability of current error handling techniques to handle multi-threaded code. In the example above, if the three errors each occurred on three different threads of code, the information pertaining to the three errors may be caught and stored in the same manner above. Similarly the user would be unable to access all of the information pertaining to the first and second errors without debugging the code in order to determine where all of the errors occurred. However where each error occurred in a different thread, with different states, information pertaining to the state of each thread of code would be combined in the global state. The resulting combination of information pertaining to three threads of code would be difficult to use in debugging any of the threads of code.

In an exemplary embodiment of the invention, an exemplary error handling technique may address errors that occur in single-threaded code and/or in multi-threaded code at run time. Single-threaded code may refer to a sequence of instructions, which are executed linearly in time to accomplish one or more tasks. For example, single-threaded code may include one or more code blocks. Code blocks may be a sequence of instructions. Code blocks may, or may not, be enclosed within an error-handling mechanism. Code blocks may call one or more additional code blocks.

Multi-threaded code may refer to several independent sequences of instructions. Each independent sequence of instructions may be referred to as a thread. Each thread may be executed linearly in time to accomplish one or more tasks independent from the other threads. Each thread in multi-threaded code may call one or more code blocks as discussed above. Multi-threaded code may also contain successive synchronization points that are common to all threads. Synchronization points denote points at which the execution of a thread must wait for the other thread(s) of code to reach before continuing.

As single-threaded code is executed, one or more errors may occur in successive code blocks, which are discussed below in connection with FIG. 1A, or within the same code block, which is discussed below in connection with FIG. 2. As multi-threaded code is executed, one or more errors may occur, in individual threads of code, in successive code blocks, which are discussed below in connection with FIG. 1B, or within the same code block, which is discussed below in connection with FIG. 2.

Figure 1B:
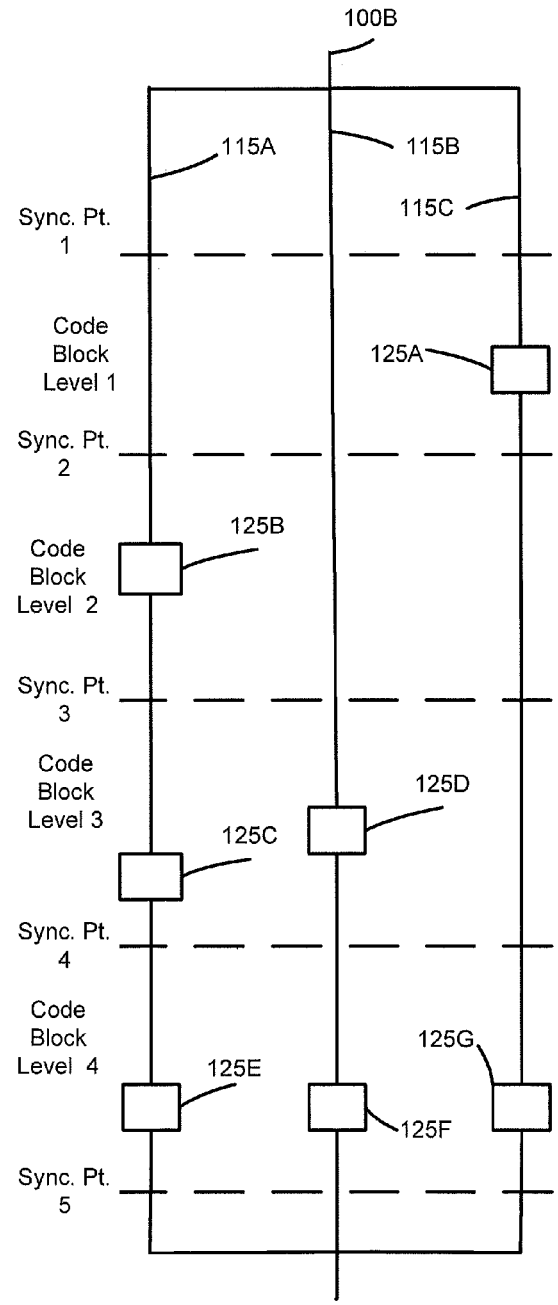

FIGS. 1A and 1B depict the execution of an exemplary single-threaded code 100A and an exemplary multi-threaded code 100B, respectively, according to an exemplary embodiment of the invention. In FIG. 1A, exemplary single-threaded code 100A has four code blocks 1, 2, 3, 4. As the exemplary single-threaded code 100A is executed, errors 110A may occur in Code Block 2. Error 110B may occur in Code Block 4.

In FIG. 1B, the exemplary multi-threaded code 100B includes three threads of code 115A, 115B, 115C. Each thread 115A, 115B, 115C in the exemplary multi-threaded code 100B may include four code blocks 1, 2, 3, 4 separated by five synchronization points 1, 2, 3, 4, 5 common to all three threads. As the exemplary multi-threaded code 100B is executed, errors may occur in each thread of the code 115A, 115B, 115C. For example, errors 125B, 125C and 125E may occur during the execution of thread 115A in code blocks 2, 3, and 4. Errors 125D and 125F may occur during the execution of thread 115B in code blocks 3 and 4. Errors 125A and 125G may occur during the execution of thread 115C in code blocks 1 and 4. Errors in separate threads of code may occur in the same or different level of code blocks. For example, in the level comprising code block 3, specifically the code between synchronization points 3 and 4, errors 125C and 125D occurred in thread 115A and thread 115B, respectively. In the level comprising code block 4, specifically the code between synchronization points 4 and 5, errors 125E, 125F, and 125G occurred in threads 115A, 115B, 115C, respectively.

An error may occur, for example, when a code block detects at least one abnormal condition and chooses to interrupt its own execution. A code block may choose to interrupt its own execution when an abnormal condition is detected that may make the program fail or yield unacceptable results. Each abnormal condition may result in an error occurring. The exemplary error handling techniques may identify an abnormal condition by comparing the code's actual state against the code's expected state. The code's state may refer to data, associated with the code, as it exists in a computer-readable medium at a specific point during code execution. The data associated with the code may include, for example, values, variables, values associated with variables, and the current position in the code. The code's actual state may refer to the state of the code's state during actual code execution. The expected state of the code may refer to the intended state of the code during code execution. When the code's actual state differs from the expected state, an abnormal condition may have occurred. The expected state may be specified, for example, by default settings of the language, programming or execution environment, and/or by the user. The language/environment and/or the user may specify the expected state such that the environment matches the needs of a specific application.

Errors may be arranged into error classifications or sub-classifications within a classification system. The error classification system may be specified, for example, by default settings of the language, programming or execution environment, and/or by the user. For example, an error can be classified as a numerical error and further sub-classified as an overflow error.

Once an abnormal condition has been detected within a code block, the code block may choose to interrupt its own execution in order to deal with the abnormal condition. An error occurs when the code block chooses to interrupt its own execution in order to deal with an abnormal condition. A code block may choose to interrupt its own execution to deal with the abnormal condition based on the particular task, or tasks, being performed by the code block. If the code block is unable to complete all or part of its assigned task because of the abnormal condition, it may choose to interrupt its own execution.

An error may result from the detection of one or more abnormal conditions irrespective of where the abnormal conditions occur. As single-threaded code is executed, an error, caused by one or more abnormal conditions, may occur in the same code block where the abnormal condition occurred, or in a later executed code block. In addition, as multi-threaded code is executed, an error, caused by one or more abnormal conditions, may occur in the same code block where the abnormal condition occurred, in a later executed code block, or in a separate thread from where the abnormal condition occurred.

An error may also result from another error. Where a single thread of code is executing, an error may have occurred in a previous code block or in the same code block as the error it caused. Where multiple threads of code are executing, an error may have occurred in the same code block, in a previous code block in any of the multiple threads, or in a code block, in any of the multiple threads, at the same-level as the error it caused. Where an error is caused by more than one same-level error, occurring in the same thread of code, the multiple errors may constitute an array of causes. An array of causes may refer to the presence of multiple, same-level errors in a single thread of code and not to how those errors may eventually be stored.

As the ensuing paragraphs will describe, each time an error occurs in a code block, either in single-threaded code or multi-threaded code, an error exception object may be created, thrown, caught, and/or stored. The error exception object may include information associated with an error and/or the state of the code at the time the error occurred. The error exception object may be created, thrown, caught, stored, and rethrown from inside of a code block containing an error handling mechanism (commonly known as a try/catch construct). Error handling mechanisms allow a user to catch error exception objects and attempt to handle or resolve them instead of allowing the program to terminate. The error exception object may also be rethrown from outside of the error handling mechanism which created, threw, caught, and stored the error exception object. Once the error exception object has been created, thrown, caught, and stored, the error exception objects may be accessed, by the user, from inside of the error handling mechanism that generated the error exception object. If the error exception object was generated by a code block that was called by another code block, the error exception object may also be accessed from within the code block that called the code block which generated the error exception object. Once an error exception object has been accessed, either from inside or outside of the code block, the contents of the error exception object may be displayed, used as a cause for another error exception, edited, or rethrown.

As discussed above, a code block may or may not be enclosed within an error-handling mechanism. A code block that is not enclosed by an error-handling mechanism may rely on the error-handling mechanism of the code block that called it. When an error occurs in a code block that is not enclosed by an error-handling mechanism, an error exception object may be created and thrown. The error exception object, however, may be caught by the code block that called the code block in which the error occurred.

Figure 2:
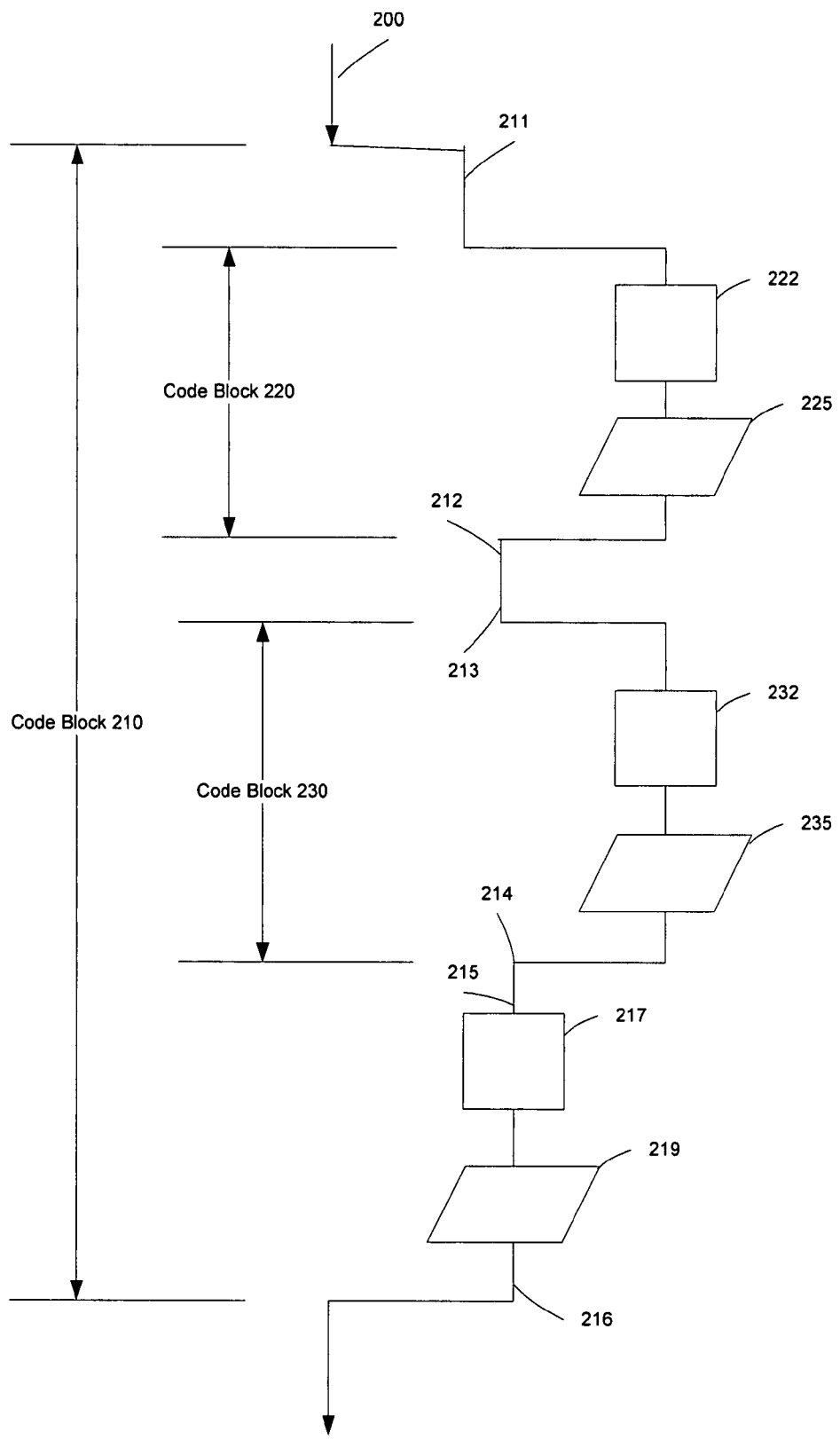
FIG. 2 depicts the execution of exemplary code according to an exemplary embodiment.

FIG. 2 depicts an exemplary code block 210 within an exemplary thread 200 of code. Thread 200 of code may be the only thread of a single-threaded code or one thread within multi-threaded code. As thread 200 executes, code block 210 may be executed. As code block 210 is executed, code block 210 may call code block 220. Code block 220 may not contain an error-handling mechanism. Instead, code block 220 may be enclosed in error handling mechanism 211, 212. Error handling mechanism 211, 212 may be located in code block 210 at a point 211 before code block 210 calls code block 220 and at point 212 code block 220 finishes executing. As code block 220 executes, error 222 may occur. In response to the error, code block 220 may throw error exception object 225. Since code block 220 may rely on the error handling mechanism 211, 212 inside code block 210, the error exception object 225 may not be caught within code block 220. Instead, error exception object 225 may be thrown out of code block 220 and caught by code block 210 at point 212. If, after catching and handling error exception object 225, code block 210 decides to continue executing code, code block 210 may call and then execute code block 230. Code block 230 may not contain an error-handling mechanism. Instead, code block 230 may be enclosed in an error handling mechanism 213, 214. Error handling mechanism 213, 214 may be located in code block 210 at point 213 before code block 210 calls code block 230 and at point 214 after code block 230 finishes executing. As code block 230 executes, error 232 may occur. In response to the error, code block 230 may throw error exception object 235. Since code block 230 may rely on the error handling mechanism 213, 214 inside code block 210, error exception object 235 may not be caught within code block 230. Instead, error exception object 235 may be thrown out of code block 230 and caught by code block 210 at point 214. After handling error exception object 235, code block 210 may decide to continue executing code, which may contain additional code blocks, or return an error of its own. In FIG. 2, code block 210 may return error 217 of its own. Error 217 may have been caused by errors 222 and 232, referred to as same-level errors because they occurred at the same depth of execution compared to code block 210. In response to error 217, code block 210 may throw an error exception object 219. Error exception object 219 may contain all of the causes of error 217, such as errors 222 and 232. Error exception object 219 may be caught by error handling mechanism 215, 216 in code block 210.

Figure 3:
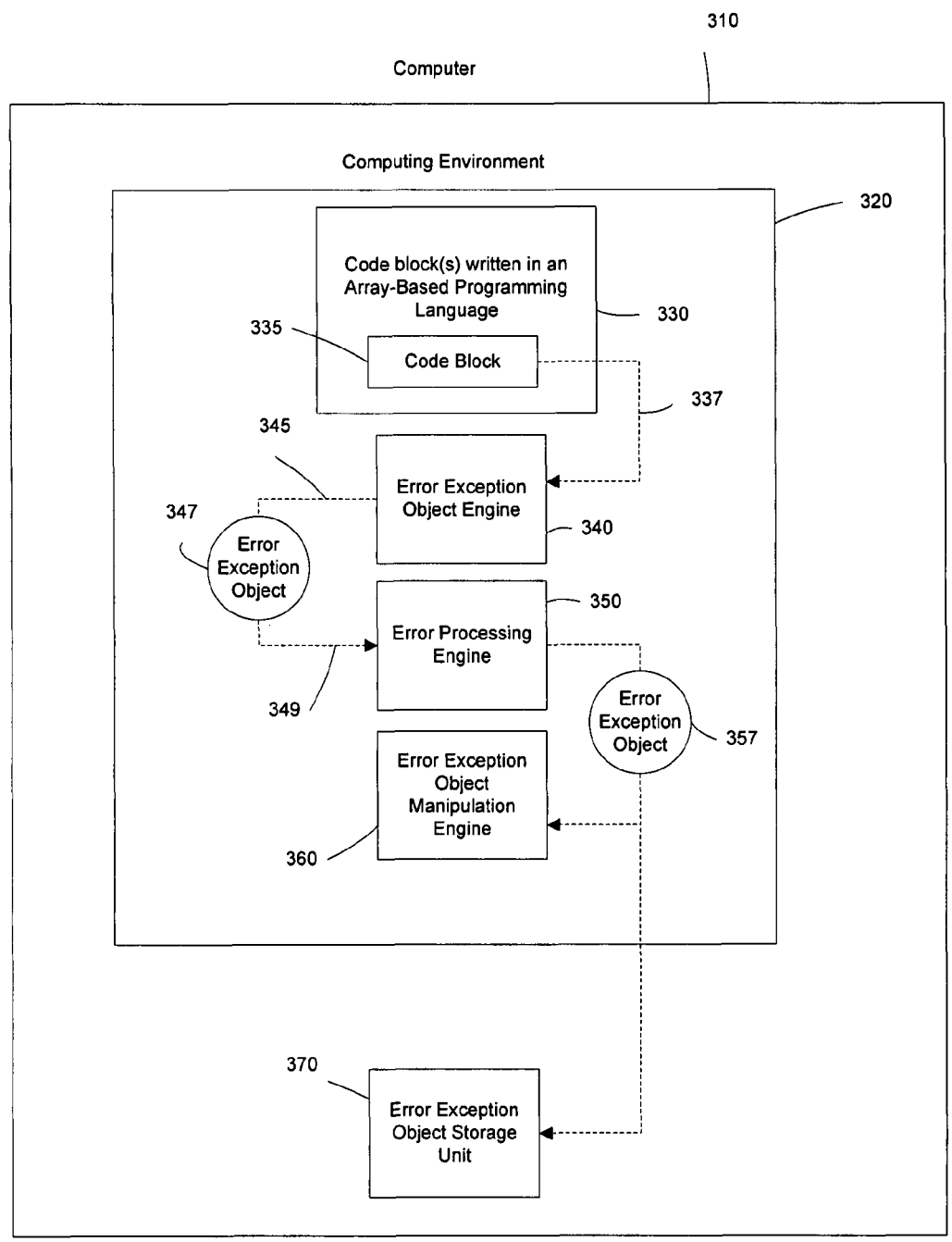
FIG. 3 depicts an exemplary computer for use with exemplary embodiments.

FIG. 3 depicts a computer 310 for use with an exemplary embodiment of the present invention. The computer 310 may include a computing environment 320 and an error exception object storage unit 370. As an example, the computing environment 320 may employ an array-based mathematical programming language and/or a dynamically typed language. The array-based language may include commands operating on matrix or vector data types and may be optimized for those operations. Examples of the array-based mathematical programming language may include the language of MATLAB® computing environment by The MathWorks, Inc. of Natick, Mass. or any other language that includes at least some commands that are executable in the MATLAB® computing environment. Alternative embodiments may employ other programming languages, whether industry standard or custom-designed. The techniques described herein may be embodied in functional components, such as, for example, in a function, a model, a class, or other program element. As another example, the computing environment 120 may employ the ability to generate a graphical model that may be simulated. Such a computing environment 120 may be based on, for example, Simulink® software by The MathWorks, Inc. Stateflow® software by The MathWorks, Inc., Simbiology™ software by The MathWorks, Inc., LabView® by National Instruments, Inc., VisSim by Visual Solutions, Inc., or aspects of a Unified Modeling Language (UML). The techniques described herein may be embodied in functional components of such a computing environment 120, such as, for example, in a simulation block, or a simulation toolset. The techniques described herein may also generally be embodied in any textual and/or graphical programming environment. Additionally, the techniques described herein may be embedded within another computing environment such as, for example, a MATLAB® computing environment embedded within a Simulink® computing environment. In FIG. 3 the computing environment may include, for example, code blocks 335 written in the array-based programming language. Code block 335 may also enclose additional code blocks. The computing environment 320 may also include an error exception object engine 340, an error processing engine 350, and an error exception object manipulation engine 360.

The code block 335 may detect the occurrence of an abnormal condition while the code block 335 is being executed by the computing environment 320. As discussed above, the code block 335 may then decide whether to continue executing the remainder of the code block 335 or to interrupt its own execution. When the code block 335 chooses to deal with an abnormal condition by interrupting its own execution, an error has occurred. If the code block 335 opts to interrupt 337 its own execution the error exception object engine 340 may generate and throw 345 an error exception object 347. The error exception object engine 340 may be a function of, or subroutine within, the computing environment 320. The error exception object engine 340 may work in cooperation with the code block in which the error occurred, in order to throw the error exception object 347. The error exception object engine 340 is discussed further below in relation to FIG. 5.

The error processing engine 350 may catch 349 the error exception object 347 thrown 345 by the error exception object engine 340. The error processing engine 350 may be a function of, or subroutine within, the computing environment 320. The error processing object engine 350 may work in cooperation with the code block, in which the error occurred, in order to throw the error exception object 347. The error exception object 347 may also be caught by a function or subroutine that has been specified by a user. An example of a user specified function which may catch the error exception object 347 is a catch block that is, for example, part of a try/catch construct. The error processing engine 350 may forward the error exception object 357 to the error exception object manipulation engine 360. The error processing engine 350 may also forward the error exception object 357 to the error exception object storage unit 370. The error exception object 357 may be the same as the error exception object 347. The error processing engine 350 is discussed further below in relation to FIG. 5.

The error exception object manipulation engine 360 may receive an error exception object 357 from the error processing engine 350. The error exception object manipulation engine 360 may allow the user to manipulate one or more error exception objects from inside or outside of the code block that caught the error exception object 347. The error exception object manipulation engine 360 may, for example, allow the user to search within, or among, one or more error exception objects, display an error exception object(s), use an error exception object(s) as a cause for another error exception object, edit error exception objects, and/or rethrow error exception objects. Each of these abilities is discussed below in relation to FIG. 5.

The error exception object storage unit 370 may receive an error exception object 357 from the error processing engine 350. The error exception object storage unit 370 may comprise a form of memory. Memory may include any type of volatile storage devices or mediums, non-volatile storage devices or mediums, or another type of dynamic storage device that may store information. In another exemplary embodiment, the error exception storage unit 370 may be located outside of the computer 310.

Figure 4:
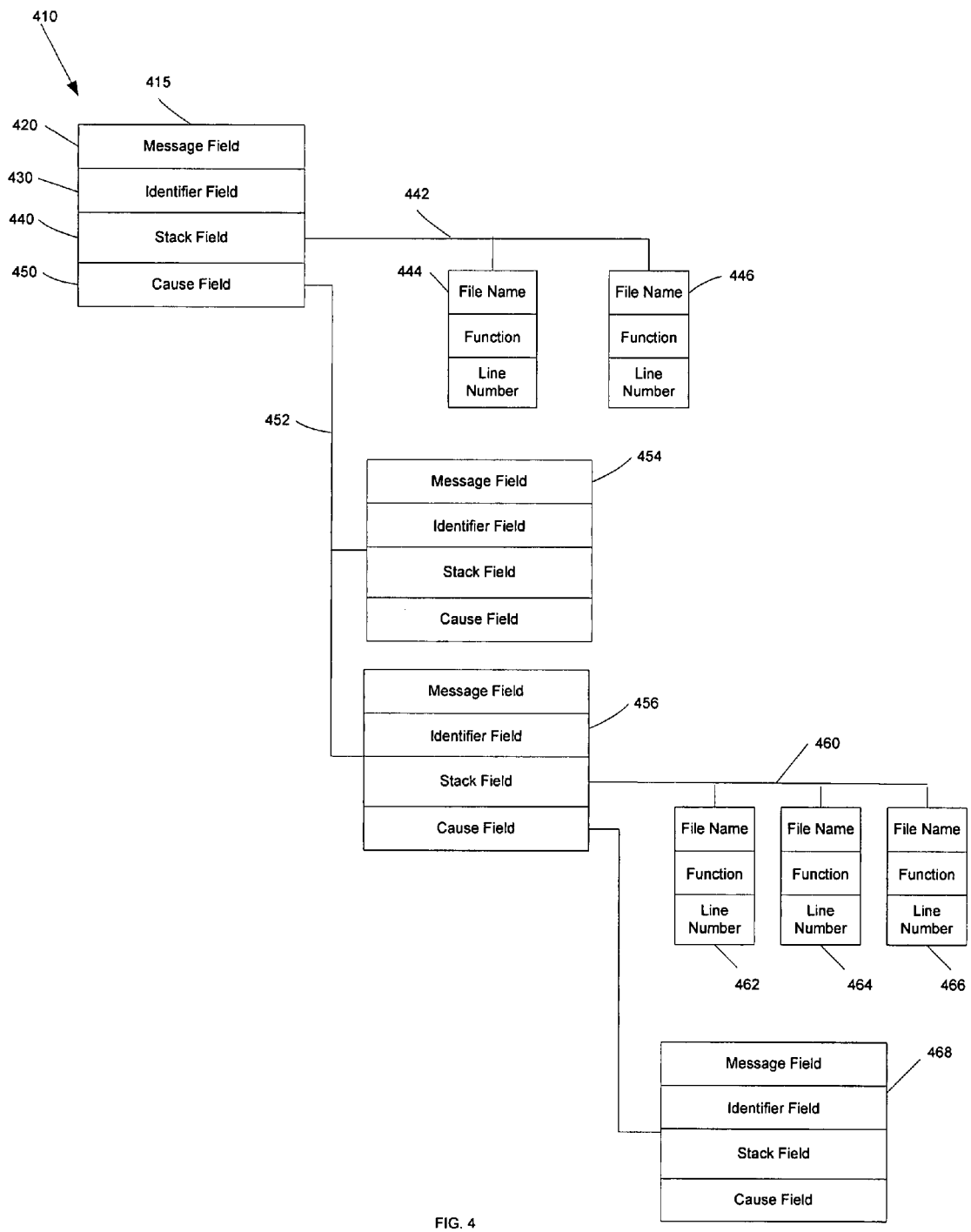
FIG. 4 depicts an error exception object according to an exemplary embodiment.

FIG. 4 depicts an exemplary error exception object 410. As illustrated in FIG. 4, an error exception object 410 may include, for example, four properties: a message property, an identifier property, a stack property, and a cause property. These four properties may be implemented in a message field 420, an identifier field 430, a stack field 440, and a cause field 450, respectively, of the structure 415 representing the error exception object 410.

The message field 420 may include, for example, a character array including, for example, text of an error message associated with a particular error. The message field 420 may include, for example, a character array containing a description of the error. This description may assist the user in determining the cause, and possibly the remedy, of the failure.

The identifier field 430 may include, for example, a character array or numeric value identifying or classifying the error. An error exception object may be assigned specific message identifiers in accordance with a default setting in the computing environment 320 or in accordance with the user's preferences.

The stack field 440 may include, for example, one or more structures providing information on the location of the error. In FIG. 4, structure 444 may identify a file name, function, and line number where the error occurred. If the error occurred in a function that was called by another function, the stack field may contain additional structures. For example, structure 446 may identify a file name, function, and line number of the calling function. The stack field may be represented by an N-by-1 array 442, where N represents the depth of the stack. In FIG. 4, the stack field is represented by a 2-by-1 array 442 having the structures 444 and 446.

The cause field 450 may include, for example, information regarding the command that caused the error, such as, for example, a description of the abnormal condition or abnormal conditions that lead to an error. Additionally, the cause field 450 may contain information on error exception objects, which have already been caught by the code and are related to the error which stopped the code. These error exception objects may be saved in the cause field 450 of the primary exception. These error exception objects may have arisen in the same thread or a different thread. Where an error is caused by more than one abnormal condition and/or error, the multiple causes may be arranged in an M-by-1 array 452, where M represents the depth of the cause field. In FIG. 4, error exception object 454 and error exception object 456 may be stored in a 2-by-1 array 452. Additionally, error exception objects 454 and 456 may contain information in their respective identifier, message, stack, and cause fields. For example, the stack field of error exception object 456 may contain a 3-by-1 array 460 comprising three structures 462, 464, 466. The cause field of error exception object 456 may contain a 1-by-1 array comprising error exception object 468.

Figure 5:
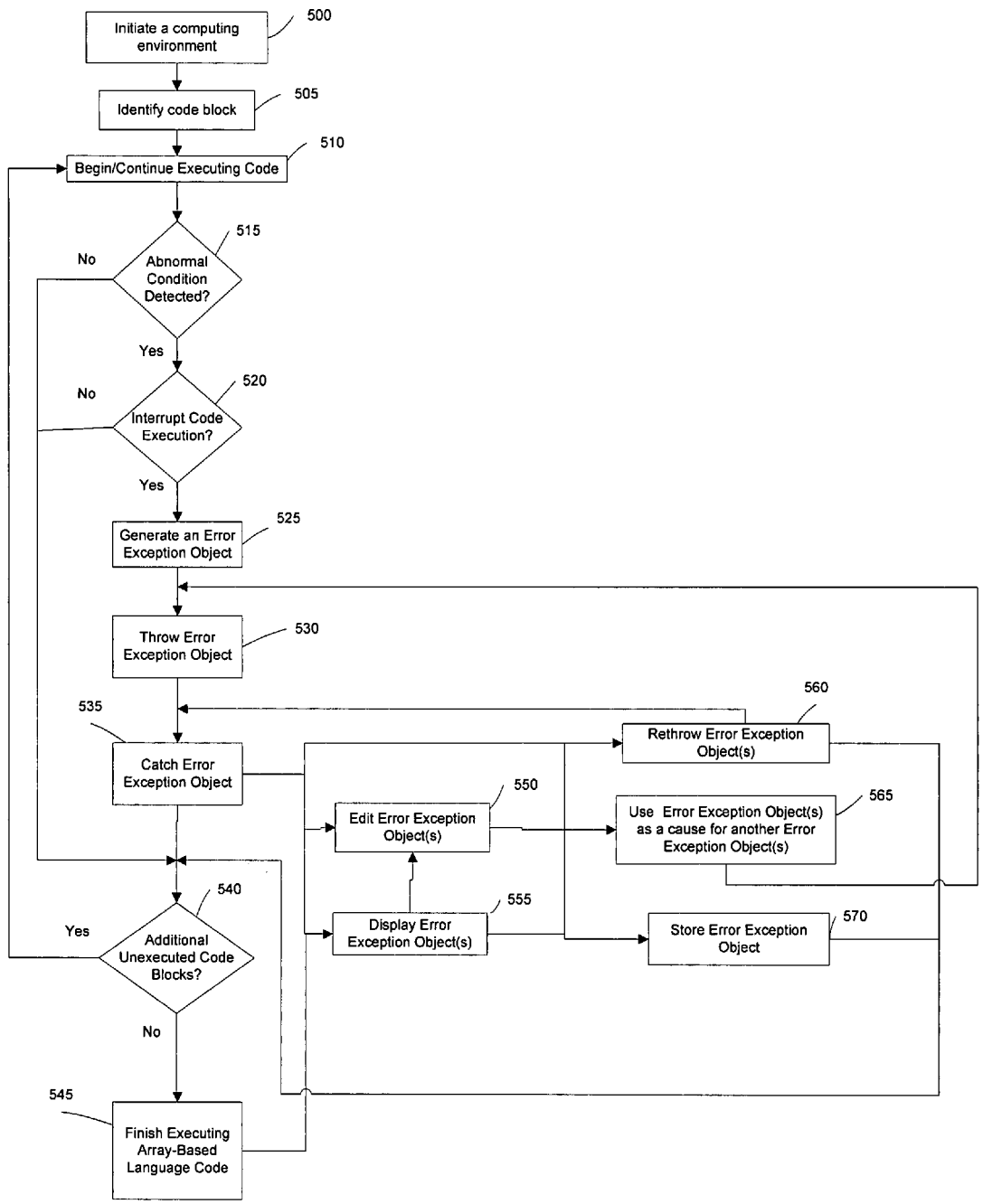
FIG. 5 depicts a flow chart for an exemplary embodiment.

FIG. 5 depicts a flowchart for an exemplary technique of exception based error handing that utilizes the exemplary computer 310 of FIG. 3. In block 500, the computing environment 320 may be initiated to run on the computer 310, a computer system, or the like.

In block 505, a code block 335 may be identified within the computing environment 320. The code block 335 may belong to single-threaded code or multi-threaded code. The code block 335 may be identified by, for example, being created in or loaded into the computing environment 320.

In block 510, the computer 310 may begin executing the code block 335. Where code block 335 belongs to single-threaded code, subsequent code blocks may be executed linearly in time. Where code block 335 belongs to multi-thread code, individual threads of code may be executed simultaneously in a manner similar to that of single-threaded code. Additionally, the computer 310 may continue executing successive code blocks 335 after unexecuted code blocks 335 are identified by block 540.

In block 515, the code block 335 may check for an abnormal condition. If an abnormal condition is detected, the process moves to block 520. If an abnormal condition is not detected, the process moves to block 540. Block 520 and block 540 are discussed below.

In block 520, the code block 335 may choose to deal with an abnormal condition by interrupting its own execution. Where the code block 335 chooses to deal with an abnormal condition by interrupting its own execution, the process moves to block 525. Where the code block 335 does not choose to interrupt its own execution, the process moves to block 540. Blocks 525 and 540 are discussed below.

In block 525, the error exception object engine 340 may generate an error exception object 347, in cooperation with the code block 335, for the abnormal condition, detected in block 515, which prompts code block 335 to interrupt code execution in block 520. The error exception object 347 may include information associated with an error and/or the state of the code at the time the error occurred. The error exception object 347 may contain, for example, information on where the error occurred, what type of error it was, and the cause(s) of the error. As discussed in connection with FIGS. 1A, 1B and 2 above, an error may result from one or more abnormal conditions occurring in the same thread, or a separate thread(s) of code.

Figure 6:
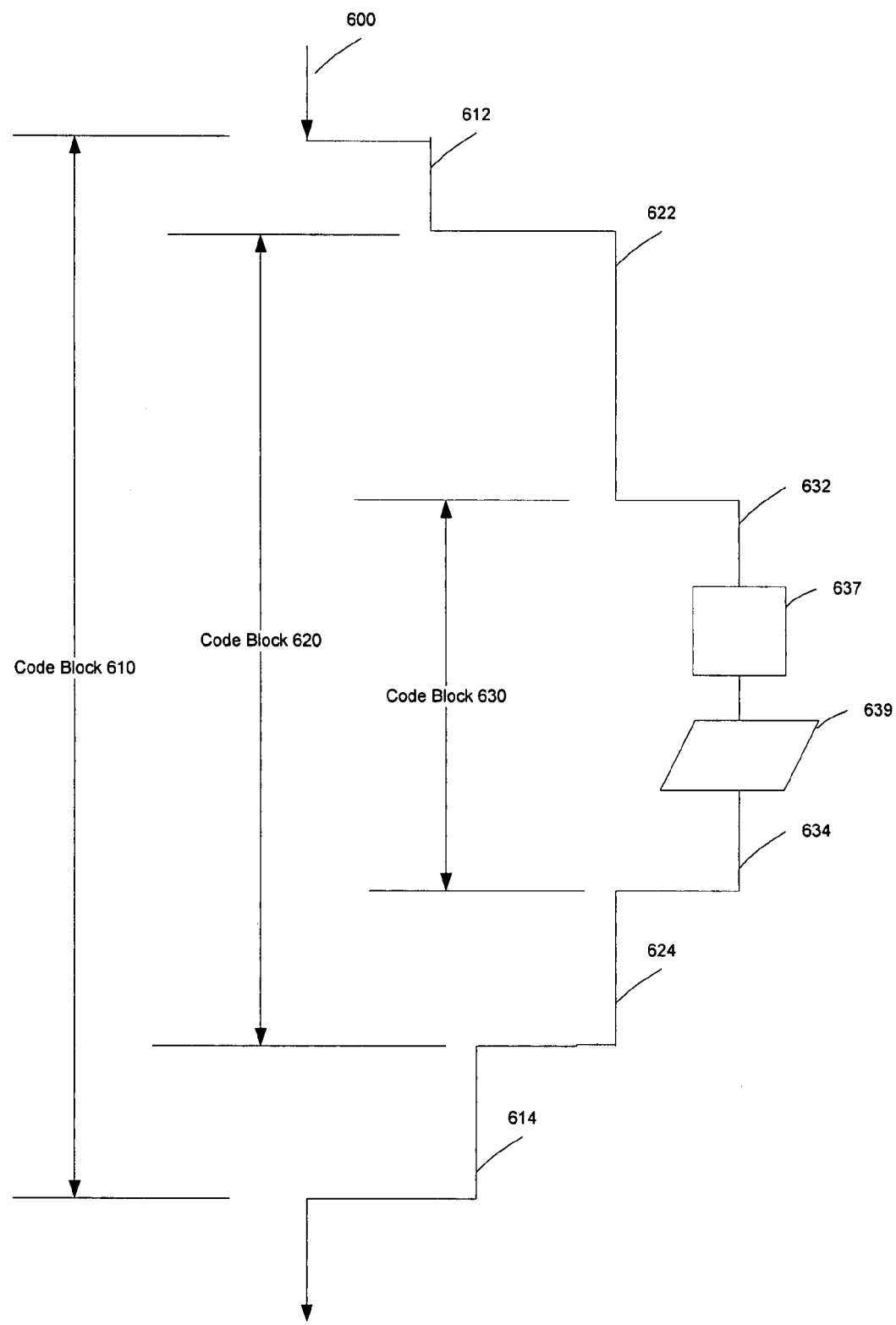
FIG. 6 depicts the execution of exemplary code according to an exemplary embodiment.

In block 530, the error exception object engine 340, in cooperation with the code block 335 in which the error occurred, may throw 345 the error exception object 347 from code block 335, which contains the error, to the error processing engine 350. The error exception object engine 340 may throw 345 the error exception object 347 by terminating the execution of the current code block 335 and relinquishing control to the error processing engine 350. Once the error has been thrown, the error processing engine 350 may return control of execution back to code block 335. When the error exception object is thrown, the error exception object 347 may originate from the code block 335 or a code block contained within code block 335, in which the error actually occurred.

Where an error occurs in a code block that is contained within and called by another code block, the error exception object engine 340 may be able to manipulate the error exception object such that it will appear to have originated, e.g. thrown, from the code block that called the code block either directly or through several layers of intermediary code blocks. This manipulation may occur regardless of where the error exception object was caught. For example, FIG. 6 depicts an exemplary code block 610 within an exemplary thread 600 of code. Thread 600 of code may be the only thread of a single-thread code or one thread within multi-threaded code. As thread 600 executes, code block 610 may be executed. Code block 610 may contain an error handling mechanism 612, 614. As code block 610 is executed, code block 610 may call code block 620. Code block 620 may contain an error handling mechanism 622, 624. As code block 620 is executed, code block 620 may call code block 630. Code block 630 may contain an error handling mechanism 632, 634. As code block 630 executes, error 637 may occur. In response to the error 637, code block 630 may throw error exception object 639. Depending on the existence of error handling mechanisms 612, 614; 622, 624; and 632, 634 in code blocks 610, 620, and 630, error exception object may be caught at points 634, 624, or 614. Once error exception object 639 has been caught, the error processing engine 350 may manipulate the error exception object such that the error exception object appears to have originated from code block 620, a mid-level code block, and/or code block 610, a top-level code block. An example of such manipulation may include modifying the stack contained within the error exception object such that it subsequently indicates an error occurred from code block 610 or 620, instead of code block 630.

In block 535, the error processing engine 350 may catch 349 the error exception object 347. The error processing engine 350 may catch 349 the error exception object 347 by taking control of executing the code. In taking control of executing the code the error processing engine 350 may also be responsible for handling the error exception object 347. The error processing engine 350 may, for example, store each error exception object in the error exception object storage unit 370 in computer 310. The error processing engine 350 may also forward error exception objects to the error exception object manipulation engine 360, which controls blocks 550-570.

The error processing engine 350 may be configured to specify a local variable where specific error exception object(s) may be stored in block 570. The error processing engine 350 may, for example, store an error exception object to a specified variable in accordance with a user specified function, a default setting, and/or a setting dynamically specified by the computing environment 320. For example, a user may store an error exception object to the local variable from inside of a code section used to generate error exception objects. FIG. 7 depicts exemplary pseudo-array-based language code for an exemplary try/catch construct. In FIG. 7, the local variable may be expressed as 'MyException' and may be placed within a code section, specifically a try/catch construct. In FIG. 7, 'try' 701 delineates the beginning of the try/catch construct. The ellipsis 702 represents at least one line of code that is to be executed by the computing environment 320. Exemplary code may be, for example, instructions on how to throw an error exception object. The code catch 703 instructs the computing environment 320 to signal the error processing engine 350 to store any error exception objects, identified by the error exception object engine 340, to the local variable 'MyException.' The ellipsis 704 may represent at least one line of code that is to be executed by the computing environment 320. Exemplary code may be, for example, instructions on how to restore the state of the code to a previously known variable. 'End' 705 signals to the computing environment 320 that the code section has ended and flow may proceed to block 540.

In addition to catching all error exception objects, the error processing engine 350 may be configured to catch, in block 535, only a specific type of error exception object(s). This may be accomplished, for example, in three ways. First, the error processing engine 350 may catch a specific type(s) of error exception object(s) based on an error exception object classification system. Error exception objects may be arranged into classifications, and sub-classifications according to a default setting in the computing environment 320 or in accordance with the user's preferences. The error exception object classification system may be based on the error classification system discussed above. The error processing engine 350 may, for example, be assigned to catch a specific type(s) of error exception object(s) in accordance with a user specified function, a default setting, and/or a setting dynamically specified by the computing environment 320. For example, a user may specify a function, from inside of a code section used to generate error exception objects, where the user is interested in catching error exception objects of a signal processing exception sub-class. FIG. 8 depicts exemplary pseudo-array-based language code for an exemplary try/catch construct. In FIG. 8, an error exception object, of a signal processing exception sub-class, may be expressed as 'signalProcessingExc' and may be placed within a code section, specifically a try/catch construct. In the code section depicted in FIG. 8, lines 801, 802, 804, and 805 operate in a similar manner as that depicted and described in connection with FIG. 7. The code 'catch MyException signalProcessingExc' 803, however, instructs the computing environment 320 to signal the error exception object engine 340 to identify any errors within a specific classification, or sub-classification. In FIG. 8 the computing environment is instructed to identify error exception objects of a signal processing exception sub-class. After executing any instructions in the catch block 804, the process may continue to block 540.

Second, the error processing engine 350 may catch an error exception object with a specific message identifier. The error processing engine 350 may, for example, be assigned to catch an error exception object(s) with a specific message identifier in accordance with a user specified function, a default setting, and/or a setting dynamically specified by the computing environment 320. For example, a user may only want to catch, from inside of a code section used to generate error exception objects, error exception objects with a specific message identifier associated with having too many inputs. FIG. 9 depicts exemplary pseudo-array-based language code for an exemplary try/catch construct. In FIG. 9, the message identifier may be expressed as 'toomanyinputs' and may be placed within a code section, specifically a try/catch construct. In the code section depicted in FIG. 9, lines 901, 902, 904, and 905 operate in a similar manner as that depicted and described in connection with FIG. 7. However 'catch MyException withid toomanyinputs' 903 instructs the computing environment 320 to signal the error detection engine 350 to identify any error exception objects with the message identifier 'toomanyinputs.' After executing any instructions in the catch block 904, the process may continue to block 540.

Figures 10, 11:
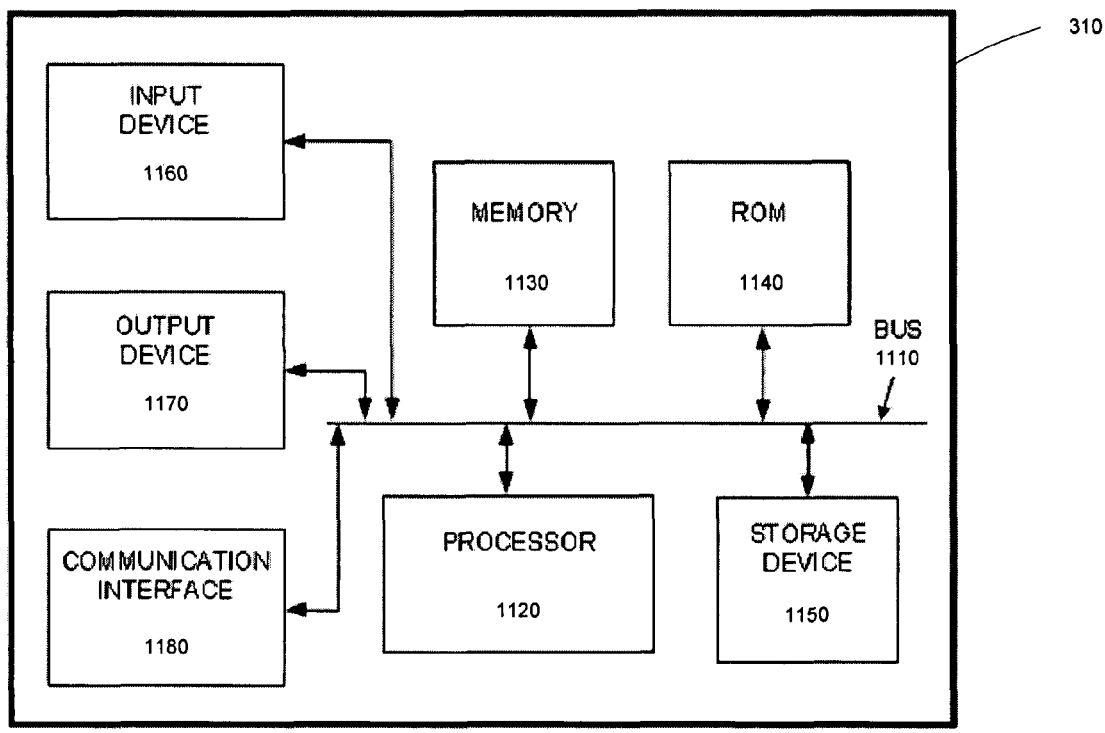
FIG. 10 depicts exemplary pseudo-array-based language code for an exemplary try/catch construct according to an exemplary embodiment.
FIG. 11 illustrates an exemplary architecture for implementing the exemplary computer of FIG. 3.

Third, the error processing engine 350 may catch an error exception object based on the error's classification and specific message identifier. The error processing engine 350 may, for example, be assigned to catch error exception objects that belong to a specific classification of error exception objects and that have a specific message identifier in accordance with a user specified function, a default setting, and/or a setting dynamically specified by the computing environment 320. For example, a user may only want to catch, from inside of a code section used to generate error exception objects, error exception objects of a signal processing exception sub-class that also have a message identifier associated with having too many inputs. FIG. 10 depicts exemplary pseudo-array-based language code for an exemplary try/catch construct. In the code section depicted in FIG. 10, lines 1001, 1002, 1004, and 1005 operate in a similar manner as that depicted and described in connection with FIG. 7. However, 'catch MyException signalProcessingExc withid toomanyinputs' 1003, instructs the computing environment 320 to signal the error detection engine 350 to identify any error exception objects in the signal processing exception sub-class that also have a message identifier 'toomanyinputs.' After executing any instructions in the catch block 1004, the process may continue to block 540.

In block 540, the computing environment 320 may determine if there is additional code that needs to be executed. If there is additional code that needs to be executed, the process moves to block 510. Otherwise, if there is no additional code that needs to be executed, the process moves to block 545.

In block 545, the computing environment 320 may finish executing the code. After execution, control flow may pass to blocks 550-570.

Blocks 550-570 may be selectively entered into, by the user, after an error exception object is caught in block 535 or once the computer 310 has finished executing code in block 545. Blocks 550-570 may be available during and/or after execution of the code written in an array based language. These blocks may be entered through the error exception objects manipulation engine 360 such that the user may move to a single block or among the blocks 550-570. The user may access blocks 550-570 via a graphical user interface (GUI) and/or via a command line. A GUI may present a tree-like view of the error information and the causes associated with it. A user may also be able to access blocks 550-570 by entering text into a command line. In one embodiment, a GUI may allow users to access portions of code where an error was generated by, for example, clicking on a hyperlink leading to that section of code.

In block 550, the user may edit error exception objects. The user may edit an error exception object to, for example, enhance or minimize an error exception object behavior if, for example, it is rethrown in block 560. The user may add, edit, or delete information in the error exception object's message field 420, identifier field 430, stack field 440, and/or cause field 450. The process may then move onto blocks 555, 560, 565, or 570.

In block 555, the error exception object may be displayed to the user. The display may include, for example, at least one of the message field 420, the message identifier field 430, the stack field 440, and the cause field 440 discussed in connection with FIG. 4. The display may be customized, according to user preferences, to display only specified information. The error exception object may be displayed via a summary window. A summary window may, for example, be a graphical user interface displayed on a displaying device connected to computer 310. The process may then move onto blocks 550, 560, 565, or 570.

In block 560, the user may rethrow an error exception object. An error exception object may be rethrown when it is thrown, again, with or without any modifications. If an error exception object is rethrown, the error processing engine 350 may catch the rethrown error exception object by taking control of executing the code in block 535.

In block 565, the error exception object may be used as a cause for another error exception object. This may be accomplished by creating a new error exception object in which the error exception object in question is listed as the cause. The process may then moves to block 570, discussed above.

FIG. 11 illustrates an exemplary architecture for implementing computer 310 of FIG. 3. It will be appreciated that other devices that can be used with the computer 310 may be similarly configured. As illustrated in FIG. 11, computer 310 may include a bus 1110, a processor 1120, a memory 1130, a read only memory (ROM) 1140, a storage device 1150, an input device 1160, an output device 1170, and a communication interface 1180.

Bus 1110 may include one or more interconnects that permit communication among the components of computer 310.

Processor 1120 may include any type of processor, microprocessor, or processing logic that may interpret and execute instructions (e.g., a field programmable gate array (FPGA)). Processor 1120 may include a single device (e.g., a single core) and/or a group of devices (e.g., multi-core). Memory 1130 may include a random access memory (RAM) or another type of dynamic storage device that may store information and instructions for execution by processor 1120. Memory 1130 may also be used to store temporary variables or other intermediate information during execution of instructions by processor 1120.

ROM 1140 may include a ROM device and/or another type of static storage device that may store static information and instructions for processor 1120. Storage device 1150 may include a magnetic disk and/or optical disk and its corresponding drive for storing information and/or instructions. Storage device 1150 may include a single storage device or multiple storage devices, such as multiple storage devices operating in parallel. Moreover, storage device 1150 may reside locally on computer 310 and/or may be remote with respect to computer 310 and connected thereto via a network and/or another type of connection, such as a dedicated link or channel.

Input device 1160 may include any mechanism or combination of mechanisms that permit an operator to input information to computer 310, such as a keyboard, a mouse, a touch sensitive display device, a microphone, a pen-based pointing device, and/or a biometric input device, such as a voice recognition device and/or a finger print scanning device. Output device 1170 may include any mechanism or combination of mechanisms that outputs information to the operator, including a display, a printer, a speaker, etc.

Communication interface 1180 may include any transceiver-like mechanism that enables computer 310 to communicate with other devices and/or systems, such as a client, a license manager, a vendor, etc. For example, communication interface 1180 may include one or more interfaces, such as a first interface coupled to a network. Alternatively, communication interface 1180 may include other mechanisms (e.g., a wireless interface) for communicating via a network, such as a wireless network. In one implementation, communication interface 1180 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 310 may perform certain functions in response to processor 1120 executing software instructions included in a computer-readable medium, such as memory 1130. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments of the invention may be embodied in many different ways as a software component. For example, it may be a stand-alone software package, or it may be a software package incorporated as a tool in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

Each of the blocks in the flowchart of FIG. 5 may be implemented with one or more computer-executable instructions. The one or more computer-executable instructions may be stored on one or more computer-readable mediums.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 5, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 3 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or any combination of hardware, software, and wetware.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The examples and embodiments described herein are non-limiting examples.

The scope of the invention is defined by the claims and their equivalents.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. At least one non-transitory computer-readable medium storing computer-executable instructions, the at least one medium holding:
    one or more instructions for executing a first code block, the first code block calling a second code block;
    one or more instructions for executing the second code block;
    one or more instructions for generating an exception object based on the execution of the second code block, the exception object containing a stack field, wherein the stack field contains information about the first code block and the second code block,
    one or more instructions for modifying the stack field such that the exception object indicates that the exception object was generated by the first code block instead of by the second code block;
    one or more instructions for storing the exception object in memory; and one or more instructions for receiving the exception object at a third code block.

2. The at least one medium of claim 1, wherein the second code block comprises one or more instructions in an array-based language.

3. The at least one medium of claim 1, further comprising: one or more instructions for receiving the exception object at the first code block.

4. A computer-implemented method for generating an exception object, comprising:
   executing a first code block, the first code block calling a second code block;
   executing the second code block;
   generating the exception object based on the execution of the second code block, the exception object containing stack field, wherein the stack field contains information about the first code block and the second code block,
   modifying the stack field such that the exception object indicates that the exception object was generated by the first code block instead of by the second code block;
   storing the exception object in memory; and
   receiving the exception object at a third code block.

5. A system for generating an exception object, comprising:
   a processor coupled to a memory; and
   a first code block and second code block stored in the memory,
   wherein the processor is programmed to generate the exception object by:
      executing a first code block, the first code block calling a second code block;
      executing the second code block;
      generating the exception object based on the execution of the second code block, the exception object containing a stack field, wherein the stack field contains information about the first code block and the second code block,
      modifying the stack field such that the exception object indicates that the exception object was generated by the first code block instead of by the second code block;
      storing the exception object in the memory; and
      receiving the exception object at a third code block.

* * * * *